United States Patent

Inada et al.

[11] Patent Number: 5,957,512
[45] Date of Patent: Sep. 28, 1999

[54] ATTACHING DEVICE AND METHOD OF BUMPER FACE

[75] Inventors: Tamotu Inada, Nobeoka; Susumu Nishimoto, Okazaki, both of Japan

[73] Assignee: Mitsubishi Jidosha Kogyo Kabushiki Kaisha, Tokyo, Japan

[21] Appl. No.: 08/917,874

[22] Filed: Aug. 27, 1997

[30] Foreign Application Priority Data

Aug. 27, 1996 [JP] Japan .................................. 8-225724

[51] Int. Cl.⁶ .................................................. B60R 19/02
[52] U.S. Cl. ........................ 293/102; 293/120; 293/121; 293/155
[58] Field of Search .................... 293/102, 120, 293/121, 155

[56] References Cited

U.S. PATENT DOCUMENTS

| | | | |
|---|---|---|---|
| 4,364,591 | 12/1982 | Bien | 293/102 |
| 4,569,865 | 2/1986 | Placek | 293/120 |
| 4,597,603 | 7/1986 | Trabert | 293/155 |
| 4,838,593 | 6/1989 | Fleming et al. | 293/120 |
| 5,108,138 | 4/1992 | Kawaguchi | 293/102 |
| 5,169,189 | 12/1992 | Häberle et al. | 293/102 |
| 5,226,695 | 7/1993 | Flint et al. | 293/121 |

FOREIGN PATENT DOCUMENTS

| | | |
|---|---|---|
| 0256764A1 | 2/1988 | European Pat. Off. . |
| 4220972A1 | 1/1993 | Germany . |
| 2281260 | 3/1995 | United Kingdom . |

OTHER PUBLICATIONS

Abstract of Japanese reference 07137585 A, May 1995.
Abstract of Japanese reference U–62127839, Aug. 1987.

*Primary Examiner*—Gary C. Hoge

[57] ABSTRACT

An attaching device and method of a bumper face comprising a first hole for positioning formed in a front end member of a vehicle body, a second hole for positioning formed on each of lower faces of left-hand and right-hand fender panels, a first projection for positioning forming on a front end panel portion of the bumper face facing to the vehicle body side and extending backward, and a second projection for positioning vertically formed on each of upper faces of left-hand and right-hand side panel portions of the bumper face, the front end panel portion being moved in an inclining posture of the bumper face and being engaged with the front end member by fitting the first projection into the first hole, thereafter, the rear end sides of the side panel portions being moved upward with the first projection as a fulcrum, and the second projection being fitted into the second hole, thus, the upper faces of the side panel portions being respectively engaged with the lower faces of the corresponding fender panels.

6 Claims, 7 Drawing Sheets

ATTACHING DEVICE AND METHOD OF BUMPER FACE

BACKGROUND OF THE INVENTION

1. Field of the Invention

The present invention relates to attaching device and method of a bumper face covering a bumper beam of a vehicle.

2. Description of the Related Arts

A bumper is mounted to both front and rear ends of a vehicle body. The bumper protects the vehicle body and functional devices such as a lamp by absorbing collision energy when the vehicle collides with another vehicle and an object. Further, the bumper affects an aerodynamic performance of the vehicle and plays an important role in design parts. The bumper has a bumper assembly structure constructed by a bumper beam, a mechanism for absorbing the collision energy, a bumper face covering the bumper beam, etc. The bumper beam is formed by a high tensile steel member in many cases to restrain an increase in weight caused by the strengthened bumper. The bumper face is not arranged as a strengthening member, but is used to cover the bumper beam and make the bumper look more attractive. The bumper face is formed by a resin member light in weight and easily deformed when collides.

In attaching procedure to attach a bumper face to a bumper beam, there is a bumper of a type in which the bumper face is temporarily positioned in the bumper beam by projections (knock pins) for positioning and is fastened to the bumper beam by bolts. In this conventional bumper, the bumper face is mounted to the bumper beam by moving the bumper face in one direction, such as a horizontal direction from a position in just front of the vehicle.

FIGS. 1 and 2 show one example of the conventional devices for attaching a bumper face made of resin to a bumper beam and a vehicle body. In FIGS. 1 and 2, the bumper beam 3 is horizontally mounted and fixed to front ends of left-hand and right-hand front side members 2, 2 of the vehicle body 1. The bumper face 5 made of resin is fixedly mounted to the bumper beam 3 such that the bumper face 5 covers a front face of this bumper beam 3. The bumper face 5 has a beam portion 5a and projections 5b, 5b for positioning. The beam portion 5a is formed on an inner wall of the bumper face 5 such that the beam portion 5a is opposed to the bumper beam 3 and extends leftward and rightward. The projections 5b, 5b protrude backward from the beam portion 5a, facing a front side of the vehicle body. Elongated holes 5d, 5d are respectively formed at upper end flanges of left-hand and right-hand bumper side panel portions 5c, 5c. The projections 5b, 5b for positioning are respectively fitted into holes 3b, 3b for positioning formed on a front face 3a of the bumper beam 3 from the front side of the bumper beam 3 so that a front end panel portion of the bumper face 5 can be positioned both latitudinally and longitudinally (see FIG. 2). The bumper side panel portions 5c, 5c are respectively fixed to lower faces of left-hand and right-hand fender panels (not shown) by tapping screws 6, 6 inserted into the elongated holes 5d, 5d of the bumper side panel portions 5c, 5c. A front upper flange of the bumper face 5 is fixed to an upper face of the bumper beam 3 by clips 7 in plural positions (see FIG. 2). A front lower flange of the bumper face 5 is also fixed to the vehicle body side by clips (not shown) through unillustrated brackets.

It is necessary to improve an external appearance of the vehicle in mounting of the bumper face 5 to the vehicle body 1 that outer panel faces of the fender panel and the bumper side panel portion 5c are arranged to form one continuous face. Therefore, while making a fine adjustment by the elongated hole 5d, a worker is forced to arrange the outer panel face of the bumper side panel portion 5c to be continuously connected to the outer panel face of the fender panel.

However, in the above conventional attaching device of the bumper face, an attaching portion 5e to the fender panel at the rear end of the bumper side panel portion 5c is set to be aligned on a horizontal face. Accordingly, it is necessary for the worker to visually make the fine adjustment in alignment of the outer panel faces of the fender panel and the bumper side panel portion 5c. Therefore, the adjustment is unstably difficult to tend to cause dispersion in face-level adjustment. Thus, it is difficult to stabilize a quality in attaching of the bumper face. Further, as it needs the visual fine adjustment of the worker that the outer panel faces of the fender panel and the bumper side panel portion 5c are aligned with each other, no conventional bumper face can be automatically assembled by robot machines, thus, workability in assembling the bumper face is so bad.

OBJECTS AND SUMMARY OF THE INVENTION

A main object of this invention is to provide attaching device and method of a bumper face in which outer panel faces of a fender panel and a bumper side panel portion are easily aligned with each other and the bumper face can be automatically assembled by robot machines.

The present invention provides attaching device and method of a bumper face which covers a bumper beam of a vehicle having a vehicle body, a front end member of the vehicle body and left-hand and right-hand fender panels, and has a front end panel portion to be fixed to the front end member and left-hand and right-hand side panel portions formed such that upper faces of the side panel portions are respectively fixed to lower faces of the corresponding fender panels.

In the attaching device of the bumper face in the present invention, a first hole for positioning is formed in the front end member, and a second hole for positioning is formed on each of the lower faces of the left-hand and right-hand fender panels. A first projection for positioning is formed on the front end panel portion facing to the vehicle body side and extends backward, and is arranged to be fitted into the first hole from the front side thereof so as to position and engage the front end panel portion with the front end member. Further, a second projection for positioning is vertically formed on each of the upper faces of the left-hand and right-hand side panel portions, and is fitted into the corresponding second hole from below so as to position the side panel portions when the side panel portions are pushed upward with the first projection as a fulcrum in a state in which the front end panel portion is engaged with the front end member by the first projection.

When the bumper face is assembled into the vehicle body by the attaching device of the present invention, the front end panel portion is engaged with the front end member of the vehicle body by moving the front end panel portion toward the front end member (preferably, in an inclining direction) in a posture in which the bumper face is inclined such that the rear end sides of the side panel portions are lowered below the front end sides thereof. Next, the upper faces of the side panel portions are respectively engaged with the lower faces of the corresponding fender panels by moving (rotating) each of the rear end sides of the left-hand and right-hand side panel portions upward with the engaging position of the front end panel portion and the front end member as a fulcrum. Thus, outer panel faces of the fender panels and the side panel portions (bumper sides) can be assembled into one continuous face and the bumper face is easily positioned and aligned with the fender panels. Further, it is possible to avoid that the fender panels are damaged by the second projection for positioning. Accordingly, a vehicle having a high quality can be provided.

A plurality of set of the first hole for positioning and the first projection for positioning to be fitted into the first hole are preferably provided in plural positions (two positions or more) in the vehicle-width direction. Similarly, a plurality of set of the second hole for positioning and the second projection for positioning to be fitted into this second hole for positioning are preferably provided in plural positions (two positions or more) in the forward-backward direction of the vehicle. In these prefer cases, a positioning accuracy of the side panel portions and the fender panels can be improved.

A first fastening means is preferably arranged in the vicinity of the first projection for positioning in parallel therewith, and the front end panel portion may be fixed to the front end member by the first fastening means. The first fastening means may be arranged above or below the first projection, and may be also arranged in a transversal direction. The bumper face is fixed to the vehicle body side by the first fastening means after the front end panel portion is positioned in the front end member of the vehicle body by the first projection for positioning and is temporarily stopped.

Similarly, a second fastening means may be arranged in the vicinity of the second projection for positioning in parallel therewith, and the upper faces of the side panel portions may be fixed to the lower faces of the fender panels by the second fastening means. After the upper faces of the side panel portions are positioned in the fender panels by the second projection for positioning, the upper faces of the side panel portions are fixed to the lower faces of the fender panels by the second fastening means.

No adjusting work for aligning the outer panel faces with each other is required by forming the positioning projections and the fastening means mentioned above so that workability and productivity are improved. Further, the bumper face can be automatically assembled into the vehicle body.

The above and other objects, features and advantages of the present invention will become more apparent from the following detailed description.

DETAILED DESCRIPTION OF THE PREFERRED EMBODIMENTS

Figure 1:
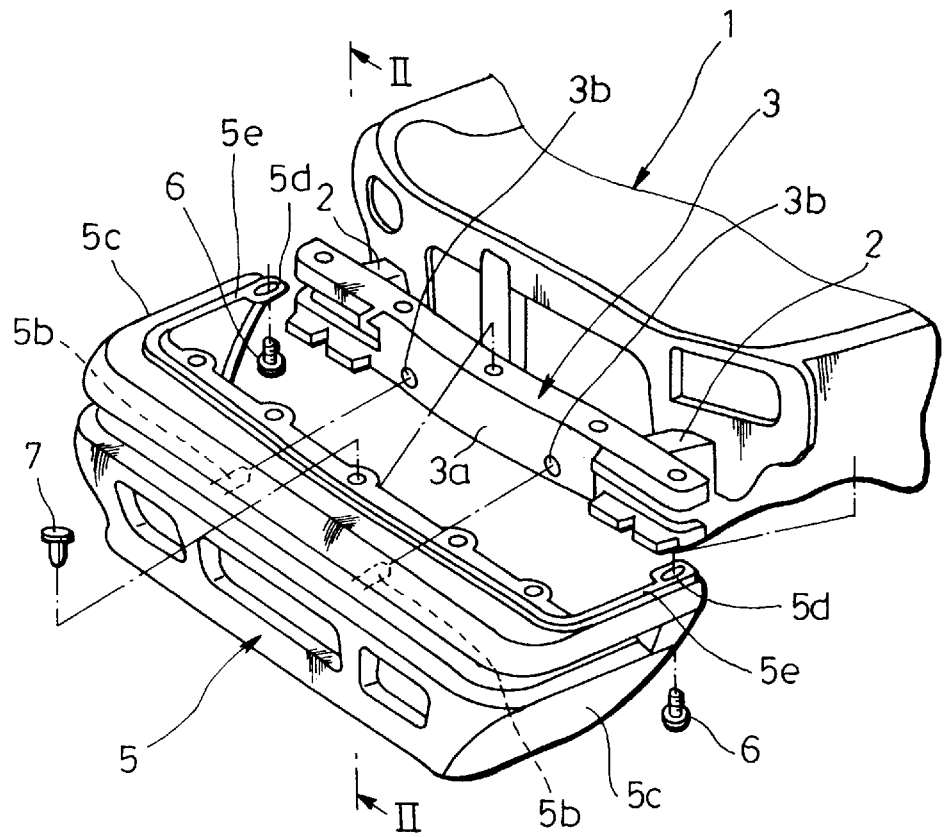
FIG. 1 is an exploded perspective view showing a conventional attaching device of a bumper face.
Figure 2:
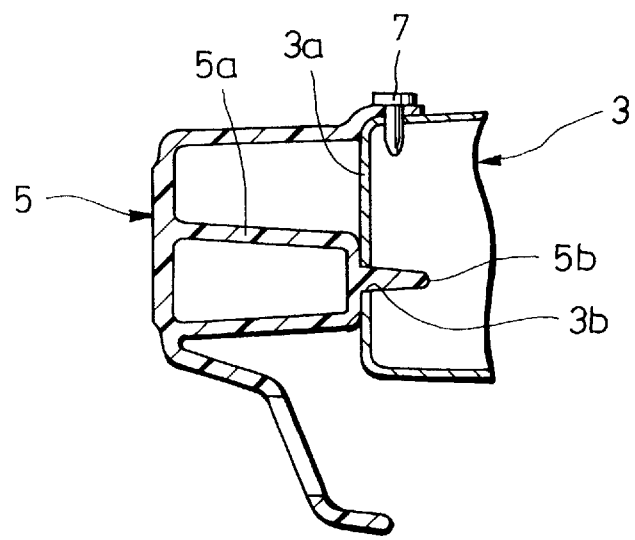
FIG. 2 is a cross-sectional view taken along an arrow line II—II after the bumper face of FIG. 1 is assembled.
Figure 3:
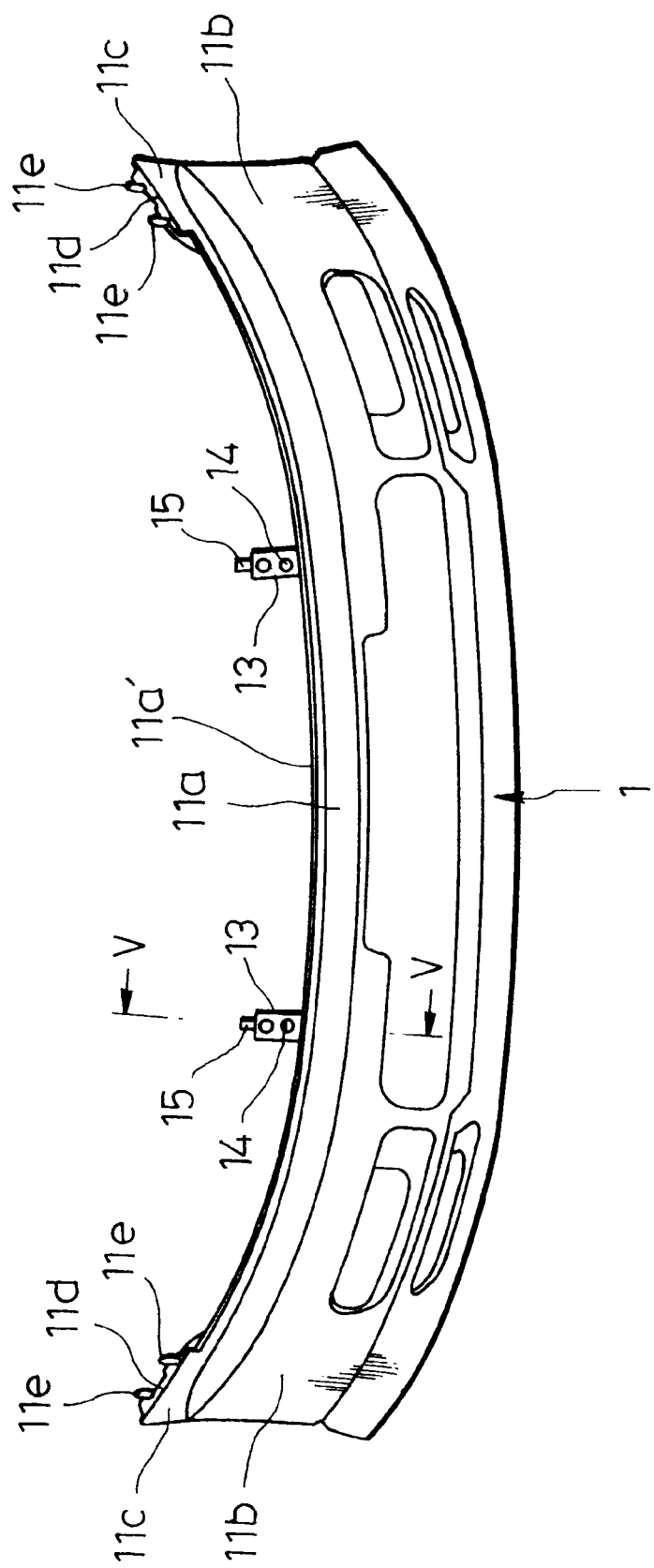
FIG. 3 is a perspective view seen slantingly from above on a front face of a resin bumper face to which an attaching device of the bumper face of the present invention is applied.
Figure 4:
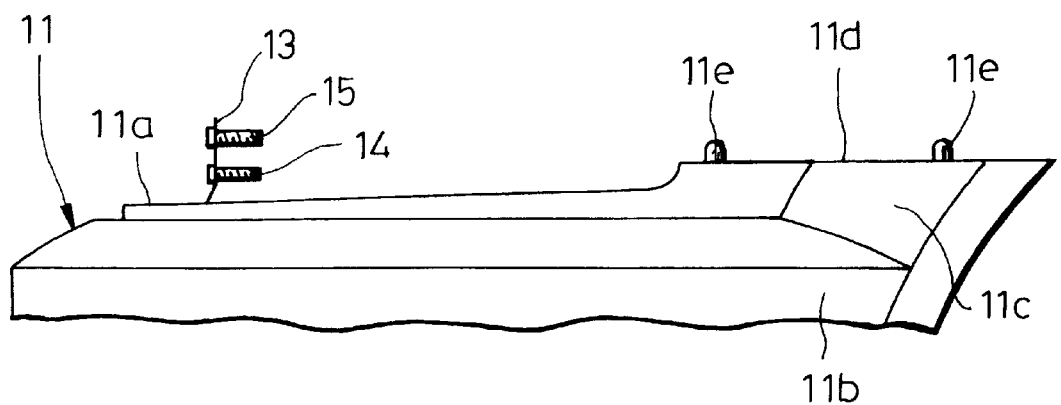
FIG. 4 is an upper side view of the bumper face of FIG. 3.
Figure 5:
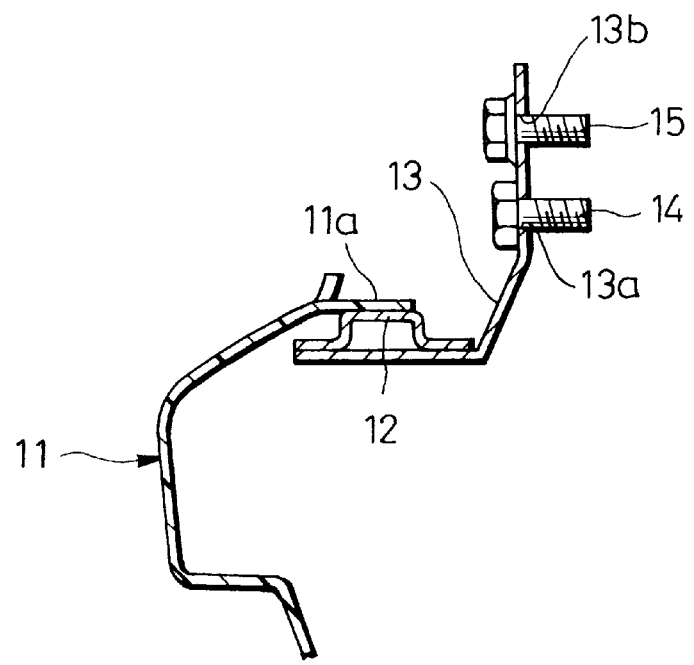
FIG. 5 is a cross-sectional view taken along an arrow line V—V of FIG. 3.

In FIGS. 3 to 5, a resin bumper face (hereinafter, simply called "bumper face") 11 in the present invention has a front end panel portion 11a and side panel portions 11b. The front end panel portion 11a is located on the front face of a vehicle body and extends in the vehicle-width direction. The side panel portions 11b extend from both left-hand and right-hand side ends of the front end panel portion 11a to the rear side of the vehicle body. The front end panel portion 11a and the side panel portions 11b are integrally molded. A bumper reinforce 12 is integrally fixed to the inner wall of an upper edge 11a' of the front end panel portion 11a along an approximately entire length thereof. Upper brackets 13, 13 are fixedly arranged in this bumper reinforce 12 in both left-hand and right-hand symmetrical positions of the bumper reinforce 12 on the central side thereof. The bumper face 11 is supported through the bumper reinforce 12 in a state in which the bumper face 11 is suspended from these upper brackets 13, 13. A projection 14 for positioning and a bolt 15 for fixing are vertically arranged in each upper bracket 13 and protrude approximately horizontally along a forward-backward direction of the vehicle body. The projection 14 for positioning and the bolt 15 for fixing are respectively inserted into holes 13a, 13b formed in the upper bracket 13 from a front side. Head portions of the projection 14 and the bolt 15 are welded to circumferential edges of the respective holes 13a, 13b. Namely, the bolt 15 for fixing is set to a weld bolt. The projection 14 for positioning may be constructed by a bolt or a rivet, etc.

Figure 6:
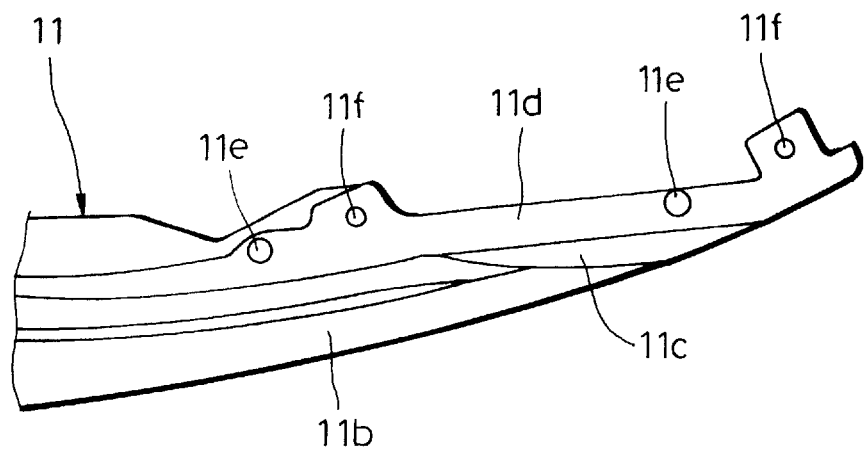
FIG. 6 is a partial plan view of an attaching portion shown in FIG. 4.

Each of upper rear ends 11c, 11c of the left-hand and right-hand side panel portions 11b, 11b is set to an attaching portion (hereinafter, called "attaching portion 11c") to a fender panel 22 (see FIG. 7). An upper face lid of each attaching portion 11c is set to a horizontal face as shown in FIGS. 4 and 6. Projections 11e, 11e for positioning protrude upward in the vicinity of front and rear ends of the upper face 11d and are integrally formed therewith. Further, small holes 11f, 11f are adjacent to the projections 11e, 11e for positioning on the upper face 11d. These small holes 11f are set to guide holes of a fastening member for an attachment to the fender panel 22.

Figure 7:
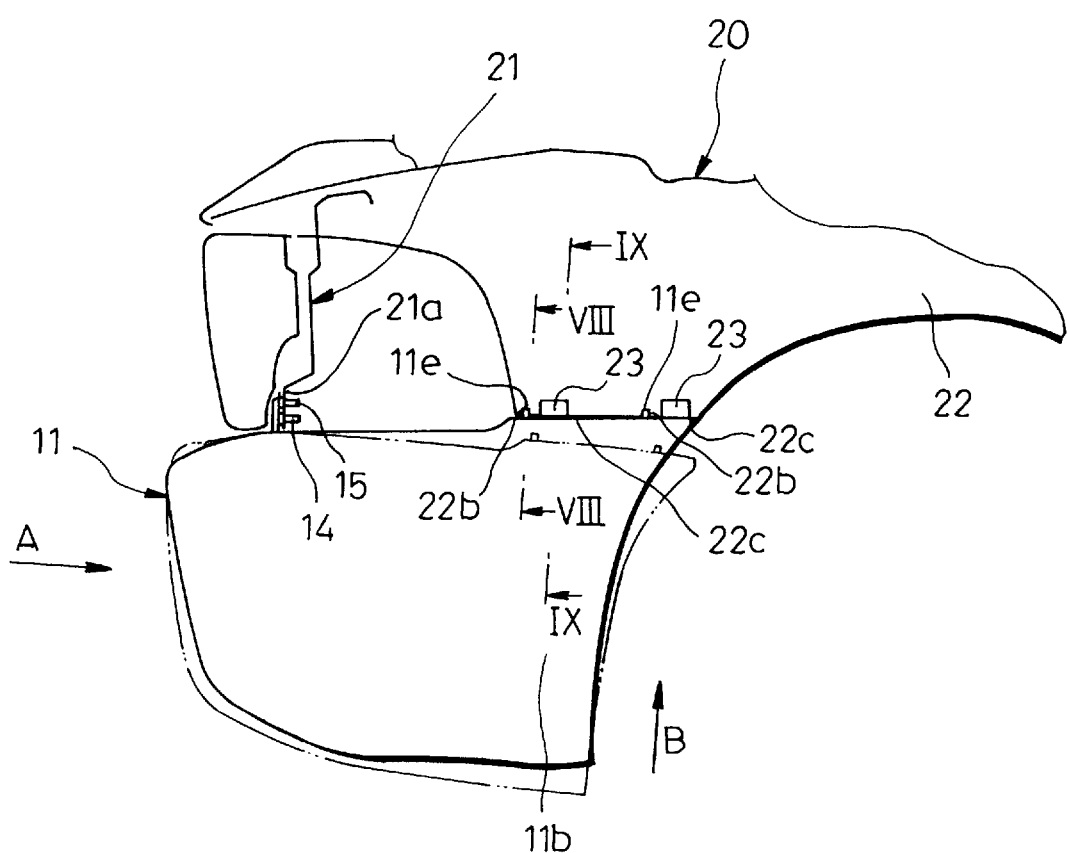
FIG. 7 is an explanatory view for showing an assembly procedure of the bumper face shown in FIG. 3 into a vehicle body.
Figure 10:
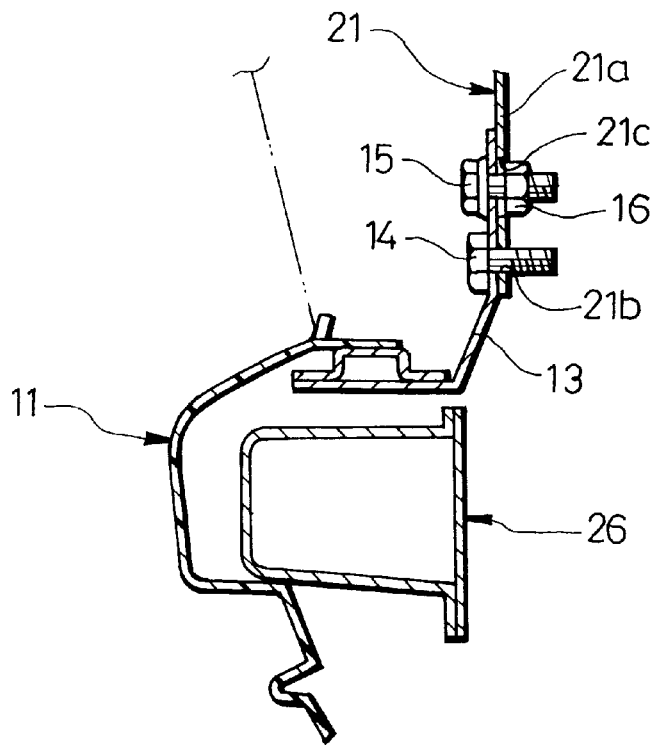
FIG. 10 is a partially sectional view showing an attaching state of an upper portion of the bumper face of FIG. 3 to the vehicle body side.

As shown in FIGS. 7 and 10, a positioning hole 21b and a bolt insertion hole 21c are formed in a lower portion 21a of a front end support panel (front end member of the vehicle body) 21 on the side of the vehicle body 20. The positioning hole 21b is located in a position corresponding to the projection 14 for positioning of each upper bracket 13 of the bumper face 11. The bolt insertion hole 21c is located in a position corresponding to the bolt 15 for fixing. The positioning hole 21b is formed in the same circular shape as a sectional shape of the projection 14 for positioning such that the projection 14 for positioning can be fitted into the positioning hole 21b with a slight clearance. The bolt insertion hole 21c is formed in an elliptical shape for allowing a vertical movement of the inserted bolt 15 for fixing. As described later, interference of the bolt 15 and the bolt insertion hole 21c is prevented when the side panel portion 11b is pushed upward with an arranging position of the projection 14 for positioning as a fulcrum.

Figure 8:
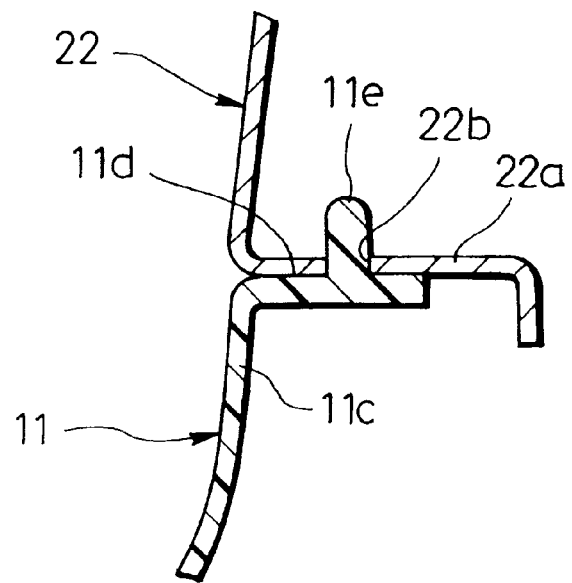
FIG. 8 is a cross-sectional view taken along an arrow line VIII—VIII of FIG. 7.

As shown in FIGS. 7 and 8, a positioning hole 22b and a square hole 22c (shown in FIG. 9) are formed on a lower face 22a of the fender panel 22 opposed to the upper face 11d of the attaching portion 11c of the bumper face 11. The positioning hole 22b is located in a position corresponding to each projection 11e for positioning of the attaching portion 11c of the bumper face 11. The square hole 22c is located in a position corresponding to each guide hole 11f. The positioning hole 22b is set such that outer panel faces of the side panel portion 11b, the attaching portion 11c and the fender panel 22 are located on the same one continuous face in a fitting state of the projection 11e fitted into the corresponding hole 22b. A resin grommet 23 is fitted into the square hole 22c such that no grommet is relatively rotated. As described later, a fastening member for fixing the bumper face, e.g., a tapping screw 24 is screwed into the grommet 23.

An assembly procedure of the bumper face into the vehicle body will next be explained.

First, as shown by an arrow A in FIG. 7, while an inclining posture for setting the rear end side of the side panel portion 11b to be lower than the front end side thereof is held, the bumper face 11 is moved in its inclining direction from a position in front of the vehicle body 20 toward this vehicle body 20 (upper bracket 13). The projection 14 for engagement and the bolt 15 for fixing arranged in each of the left-hand and right-hand upper brackets 13 are respectively inserted into the corresponding positioning hole 21b and the corresponding bolt insertion hole 21c of the lower portion 21a of the front end support panel 21 (see FIG. 10). Thus, as shown by a two-dotted chain line in FIG. 7, the front end panel portion 11a is positioned, engaged and temporarily held on the side of the vehicle body 20 in left-hand and right-hand two positions. Thus, the bumper face 11 is positioned with respect to the vehicle body in vertical and vehicle-width directions.

Next, the projection 14 for positioning temporarily held on each of the left-hand and right-hand sides is set to a fulcrum and a rear portion of the bumper face 11, i.e., each of the left-hand and right-hand side panel portions 11b is raised upward until a position shown by a solid line as shown by an arrow B of FIG. 7. The projections 11e for positioning in the attaching portion 11c are respectively fitted into the opposite positioning holes 22b of the lower face 22a of the fender panel 22 so that the upper face 11d comes in contact with the lower face 22a of the fender panel 22 (as shown in FIG. 8 in detail). The side panel portion 11b is accurately positioned and engaged with two projections 11e at both front and rear ends of the attaching portion 11c without shifting the side panel portion 11b leftward and rightward on the lower face 22a of the fender panel 22. Thus, the outer panel faces of the side panel portion 11b and the fender panel 22 are set to one continuous face.

Figure 9:
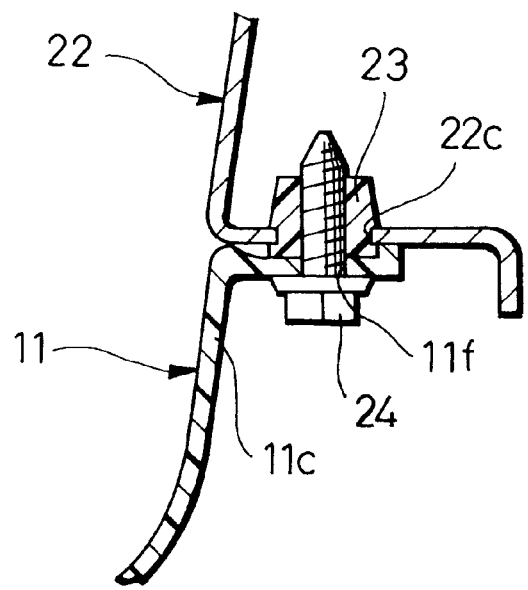
FIG. 9 is a cross-sectional view taken along an arrow line IX—IX of FIG. 7.
Figure 11:
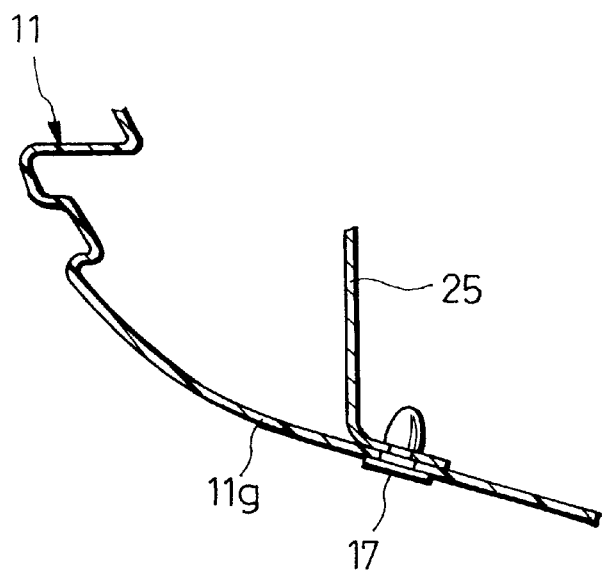
FIG. 11 is a partially sectional view showing an attachment of a lower portion of the bumper face of FIG. 3 to the vehicle body side.
Figure 12:
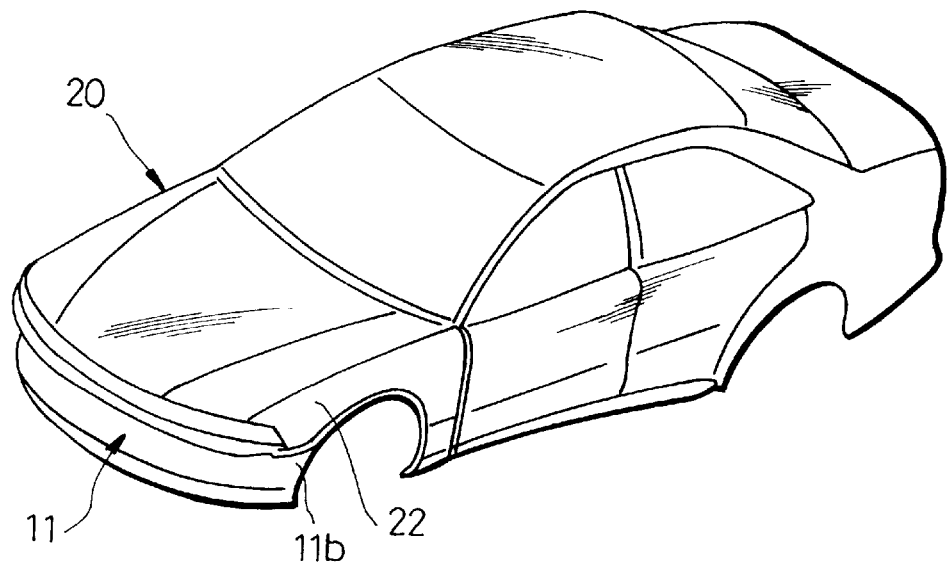
FIG. 12 is a perspective view showing an external appearance of the vehicle body mounting the bumper face of FIG. 3 thereto.

Next, as shown in FIG. 9, the tapping screw 24 is screwed into each opposite grommet 23 through each guide hole 11f from below the attaching portion 11c of the bumper face 11. Thus, the side panel portion 11b is fixed to the lower face of the fender panel 22 so that outer panel faces of the side panel portion 11b and the fender panel 22 are set to one continuous face. Next, as shown in FIG. 10, a nut 16 is fixedly screwed into the bolt 15 for fixing fitted to the front end support panel 21. As shown in FIG. 11, a lower portion 11g of the bumper face 11 is fixed by a clip 17 on each of both left-hand and right-hand sides to a bracket 25 welded to a front end cross member (not shown) on the vehicle body side. Thus, as shown in FIG. 10, the bumper face 11 is mounted to the bracket 25 such that the bumper face 11 covers a bumper beam 26. As shown in FIG. 12, the outer panel faces of the side panel portion 11b and the fender panel 22 are set to one continuous face in a state in which the bumper face 11 is mounted to the vehicle body 20.

Figure 13:
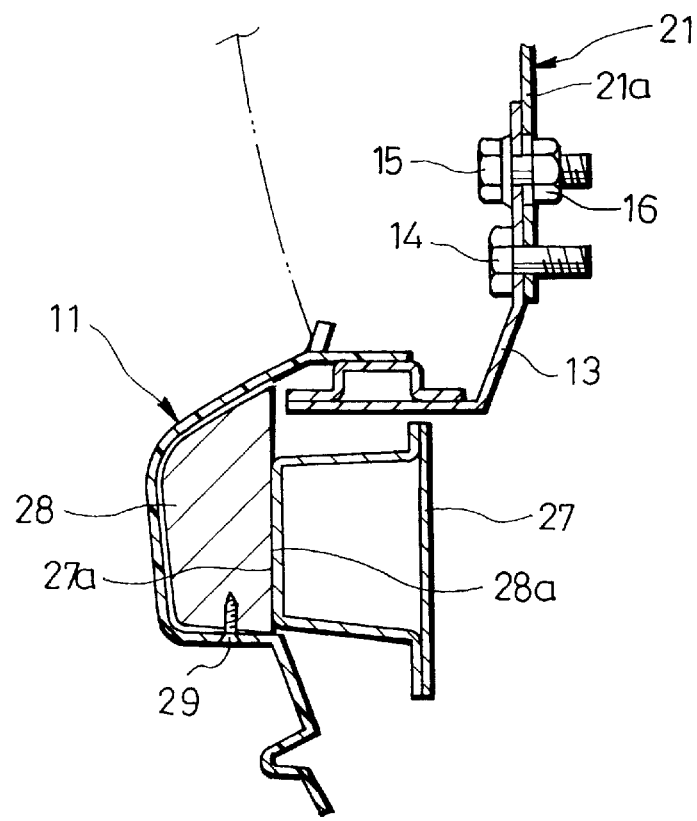
FIG. 13 is a partially sectional view of a main portion showing a state in which the bumper face of FIG. 3 equipped with an energy absorbing member is mounted to the vehicle body.

FIG. 13 shows a bumper assembly having an energy absorbing member for absorbing impact energy. The energy absorbing member 28 for absorbing the impact energy is accommodated into the bumper face 11 in a position opposed to a bumper beam 27 fixed onto a vehicle body side. The bumper face 11 and the energy absorbing member 28 are integrally fixed to each other by a tapping screw 29. Similar to the above-described embodiment, a front end panel portion of this bumper face 11 is fixed to a lower portion of a front end support panel 21 and an upper portion of a side panel portion is positioned and fixed to the lower face of a fender panel 22. In this state, a rear end face 28a of the energy absorbing member 28 comes in contact with a front end face 27a of the bumper beam 27 so that an energy absorbing bumper is constructed.

What is claimed is:

1. An attaching device of a bumper face which covers a bumper beam of a vehicle having a vehicle body, a front end member of the vehicle body and left-hand and right-hand fender panels, and has a front end panel portion to be fixed to said front end member of the vehicle body and left-hand and right-hand side panel portions formed such that upper faces of the side panel portions are respectively fixed to lower faces of the corresponding fender panels, comprising:

said front end member of the vehicle body having a first hole for positioning formed therein;

said left-hand and right-hand fender panels having a second hole for positioning formed on each of the lower faces of said fender panels;

a first projection for positioning formed on said front end panel portion facing to the vehicle body side and extending backward, and arranged to be fitted into said first hole for positioning from the front side thereof so as to position and engage the front end panel portion with said front end member of the vehicle body; and a second projection for positioning vertically formed on each of the upper faces of said left-hand and right-hand side panel portions and fitted into said corresponding second hole for positioning from below so as to position the side panel portions when said side panel portions are pushed upward with said first projection for positioning as a fulcrum in a state in which said front end panel portion is engaged with said front end member by said first projection for positioning.

2. The attaching device of the bumper face according to claim 1, wherein a plurality of set of said first hole for positioning and said first projection for positioning to be fitted into said first hole for positioning are provided in plural positions in the width direction of the vehicle.

3. The attaching device of the bumper face according to claim 1, wherein a plurality of set of said second hole for positioning and said second projection for positioning to be fitted into said second hole for positioning are provided in plural positions in the forward-backward direction of the vehicle.

4. The attaching device of the bumper face according to claim 1, further comprising a first fastening means arranged in the vicinity of said first projection for positioning in parallel therewith, and fixing said front end panel portion to said front end member.

5. The attaching device of the bumper face according to claim 1, further comprising a second fastening means arranged in the vicinity of said second projection for positioning in parallel therewith, and fixing the upper faces of said side panel portions to the lower faces of said fender panels.

6. An attaching method of a bumper face which covers a bumper beam of a vehicle having a vehicle body, a front end member of the vehicle body and left-hand and right-hand fender panels, and has a front end panel portion to be fixed to said front end member and left-hand and right-hand side panel portions formed such that upper faces of the side panel portions are respectively fixed to lower faces of the corresponding fender panels, comprising the steps of:

engaging the front end panel member of said front end member of the vehicle body by moving said front end panel portion toward said front end member in a posture in which the bumper face is inclined such that the rear end sides of said side panel portions are lowered below the front end sides thereof; and respectively engaging the upper faces of said side panel portions with the lower faces of said corresponding fender panels by moving each of the rear end sides of the left-hand and right-hand side panel portions upward with the engaging position of said front end panel portion and said front end member as a fulcrum.

* * * * *